United States Patent [19]

Hirama

[11] Patent Number: 5,274,687
[45] Date of Patent: Dec. 28, 1993

[54] SOURCE-FOLLOWER CIRCUIT FOR CCD IMAGE SENSOR

[75] Inventor: Masahide Hirama, Kanagawa, Japan

[73] Assignee: Sony Corporation, Tokyo, Japan

[21] Appl. No.: 957,149

[22] Filed: Oct. 7, 1992

[30] Foreign Application Priority Data

Oct. 8, 1991 [JP] Japan .................. 3-290845

[51] Int. Cl.$^5$ ........................ G11L 19/28
[52] U.S. Cl. ........................ 377/60; 377/57; 377/59
[58] Field of Search ............ 377/60, 59, 57

[56] References Cited

U.S. PATENT DOCUMENTS

| 5,140,623 | 8/1992 | Imai et al. | 377/60 |
| 5,172,399 | 12/1992 | Hirose | 377/60 |
| 5,210,777 | 5/1993 | Narabu et al. | 377/63 |

Primary Examiner—William L. Sikes
Assistant Examiner—Scott A. Ouellette
Attorney, Agent, or Firm—Hill, Steadman & Simpson

[57] ABSTRACT

The present invention is directed to an output circuit for a charge transfer device which can reduce a coupling voltage of a floating diffusion type charge detecting section and in which a DC fluctuation of an output from a source-follower stage can be suppressed. A dummy floating diffusion region (FD2) is provided and an output thereof is converted by and derived from a bias generator circuit (7) of a source-follower configuration as a positive phase output. This positive phase output is supplied to a load MOS transistor ($Q_2$) of a source-follower circuit (5) as a bias voltage and also fed back to the load MOS transistor ($Q_6$) of the bias generator circuit (7) as a gate voltage.

5 Claims, 3 Drawing Sheets

SOURCE-FOLLOWER CIRCUIT FOR CCD IMAGE SENSOR

BACKGROUND OF THE INVENTION

1. Field of the Invention

The present invention relates generally to an output circuit of a charge transfer device and, more particularly, to an output circuit for a charge transfer device including a floating diffusion type charge detecting section.

2. Description of the Prior Art

In conventional CCD (charge coupled device) image sensing devices using this kind of charge transfer device as a horizontal transfer section (horizontal shift register), a coupling occurs when the floating diffusion region is reset so that an output waveform thereof becomes as shown in FIG. 1 of the accompanying drawings. In the output waveform shown in FIG. 1, a level A corresponds to a black level and a level B corresponds to a white level, respectively. An amplitude voltage S corresponds to a signal voltage. A level C is the coupling voltage that is used to reset the floating diffusion region and is not utilized in the signal processing at all.

Recently a demand for making the CCD solid state image sensing device higher in sensitivity is increased more and more. The higher the CCD solid state image sensing device becomes in sensitivity, the larger the coupling voltage becomes. If the sensitivity is increased twice, for example, then the coupling voltage also is increased twice. If the coupling voltage is increased as described above, then a dynamic range of circuits such as a buffer or the like necessary for processing an output signal of the device in the outside is widened, which needs a more expensive buffer.

A charge detecting section of a floating diffusion type includes a source-follower stage composed of a drive MOS (metal oxide semiconductor) transistor $Q_1$ and a load MOS transistor $Q_2$ which converts a signal charge supplied to a floating diffusion region FD into a signal voltage as shown in FIG. 2 of the accompanying drawings. In this charge detecting section, in order to increase a conversion efficiency, an area of the gate of the drive MOS transistor $Q_1$ must be reduced and a capacitance thereof must be reduced. That is, how to reduce the scale of the drive MOS transistor $Q_1$ becomes important.

If a threshold voltage $V_{TH}$ and a channel width W of the drive MOS transistor $Q_1$ are fluctuated due to a dispersion in the manufacturing process, then a fluctuation of a DC bias of an output from the source-follower stage, in particular, is increased. There is then the possibility that a dynamic range of a buffer 6 at the succeeding stage will be widened over a limit. In this case, the CCD solid state image sensing device cannot derive an output normally. As a result, the reduction of the scale of the drive MOS transistor $Q_1$ cannot be made substantially and there arises a limit on the increase of the conversion efficiency.

OBJECTS AND SUMMARY OF THE INVENTION

Accordingly, it is an object of the present invention to provide an improved source-follower circuit for a CCD image sensor in which the aforesaid shortcomings and disadvantages of the prior art can be eliminated.

More specifically, it is an object of the present invention to provide a source-follower circuit for a CCD image sensor in which a coupling voltage of a floating diffusion type charge detecting section can be reduced.

It is another object of the present invention to provide a source-follower circuit for a CCD image sensor in which a fluctuation of a DC bias in the output of a source-follower stage can be suppressed.

According to an aspect of the present invention, there is provided a source-follower circuit for a charge transfer device which comprises charge transfer section for transferring a signal charge, a floating diffusion region provided at an output end of the charge transfer section and to which the signal charge from the charge transfer section is supplied, a source-follower stage connected to the floating diffusion region to convert the signal charge into a signal voltage and including a first load transistor and a first drive transistor, a dummy floating diffusion region to which no signal charge is supplied, and a bias generator circuit including a second drive transistor and a second load transistor, wherein an output of the dummy floating diffusion region is supplied to the second drive transistor of the bias generator circuit and a voltage developed at a junction between the second drive transistor and the second load transistor is supplied to an input of the first load transistor as a bias voltage.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
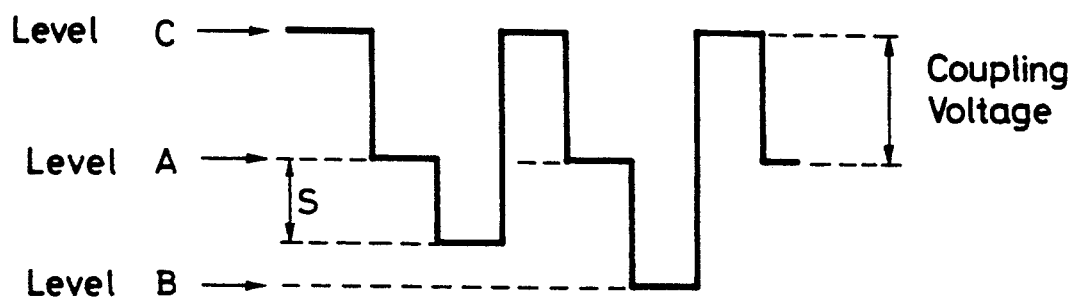
FIG. 1 is a diagram of a waveform of an output derived from a charge detecting section of a floating diffusion type according to the prior art.
Figure 2:
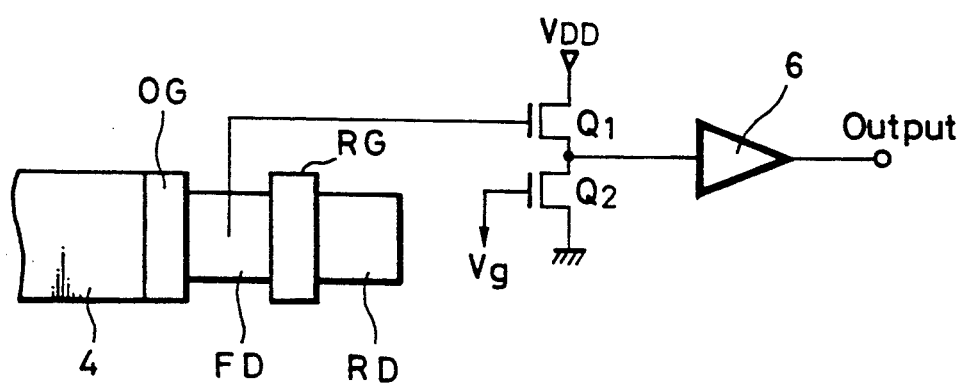
FIG. 2 is a diagram showing a structure of a charge detecting section of a floating diffusion type according to the prior art.
Figure 3:
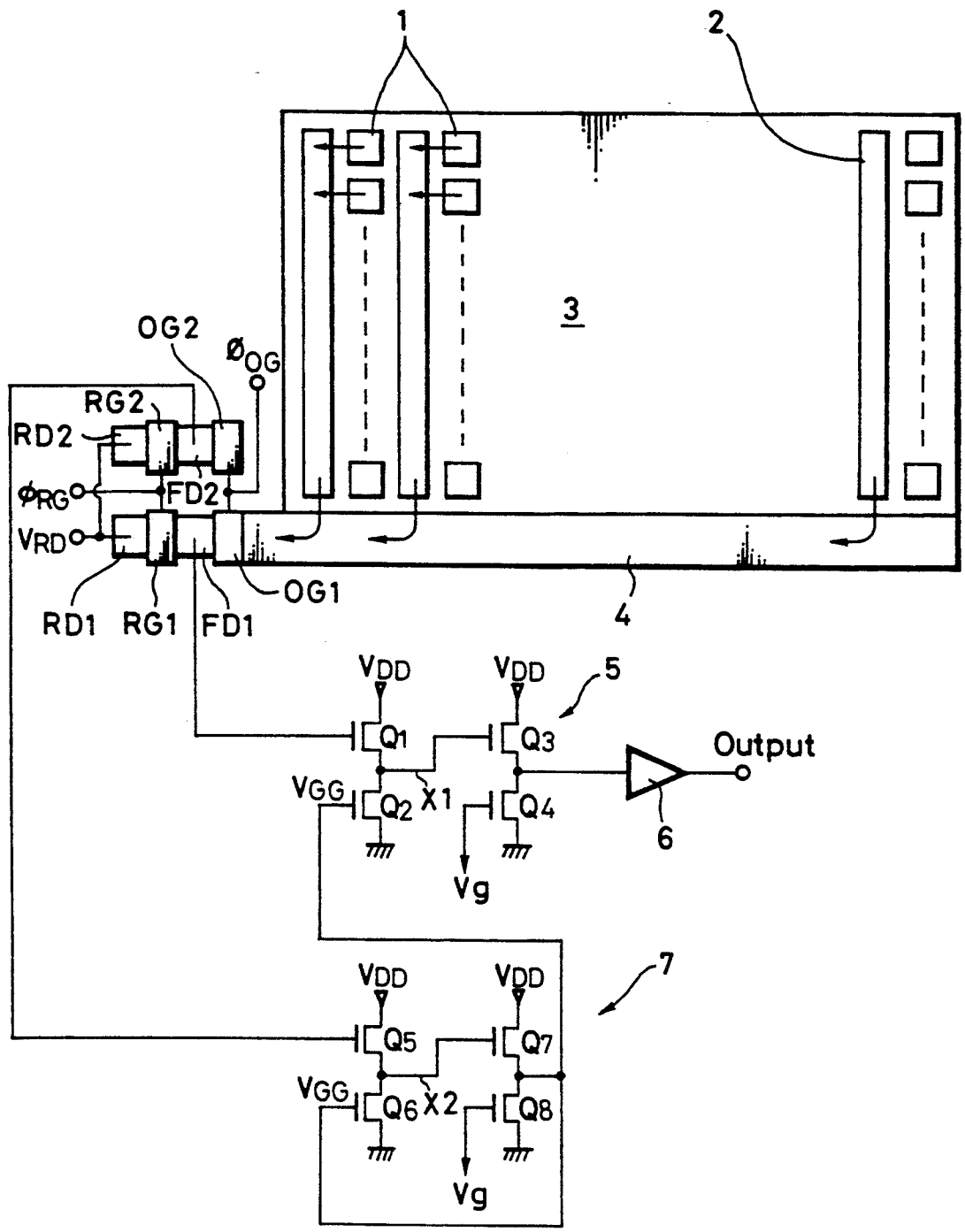
FIG. 3 is a diagram showing a structure of an embodiment of a source-follower circuit according to the present invention which is applied to a CCD solid state image sensing device.

FIG. 3 of the accompanying drawings shows a structure of a source-follower circuit according to an embodiment of the present invention which is applied to a CCD solid state image sensing device of an interline transfer type, for example.

As shown in FIG. 3, an imaging region 3 comprises a plurality of photosensors 1 arrayed in a two-dimensional fashion at the unit of pixel so as to store a signal charge corresponding to an incident light thereon and a plurality of vertical shift registers 2 disposed at every vertical row of the photosensor 1 so as to vertically transfer a signal charge that was read out from the photosensors 1 during a part of the vertical blanking period momentarily.

The signal charge supplied to the vertical shift register 2 is sequentially transferred to a horizontal shift register 4 by an amount corresponding to one scanning line during a part of the horizontal blanking period. The signal charge of the amount corresponding to one scanning line is sequentially transferred by the horizontal shift register 4 through an output gate OG1 to a floating diffusion region FD1 serving to detect a signal in synchronism with the horizontal scanning period of a television signal. The floating diffusion region FD1 is connected with a source-follower circuit 5 which converts a signal charge into a signal voltage.

The source-follower circuit 5 has a structure of, for example, two stages and comprises a drive MOS transistor $Q_1$ and a load MOS transistor $Q_2$ forming a first stage and a drive MOS transistor $Q_3$ and a load MOS transistor $Q_4$ forming a second stage. A bias voltage Vg is applied to the gate of the load MOS transistor $Q_4$ at the second stage. An output of the source-follower circuit 5 is led through the buffer 6 to the outside as a video signal output.

On the device, there is formed a dummy floating diffusion region FD2 of the same pattern as that of the signal detection floating diffusion region FD1 and to which no signal charge is supplied. Output gates OG1, OG2 and reset gates RG1, RG2 of these floating diffusion regions FD1, FD2 are connected to one another and driven by an output gate clock $\phi_{OG}$ and a reset gate clock $\phi_{RG}$ and a reset drain voltage $V_{RD}$ is applied to reset drains RD1, RD2. The dummy floating diffusion region FD2 is connected with a bias generator circuit 7 from which a bias voltage is applied to the load MOS transistor $Q_2$ in the source-follower circuit 5.

The bias generator circuit 7 comprises a drive MOS transistor $Q_5$ and a load MOS transistor $Q_6$ forming a first stage and a drive MOS transistor $Q_7$ and a load MOS transistor $Q_8$ forming a second stage. The bias generator circuit 7 is thus constructed as a source-follower circuit of two stages in which the bias voltage Vg is applied to the load MOS transistor $Q_8$ of the second stage. In the bias generator circuit 7, a channel width W and a channel length L of the drive MOS transistor $Q_5$ of the first stage are selected to be the same as those of the drive MOS transistor $Q_1$ in the source-follower circuit 5.

An output of the bias generator circuit 7 is positive in phase to the output of the dummy floating diffusion region FD2. This output of the bias generator circuit 7 is fed to the load MOS transistor $Q_6$ of the first stage as a gate voltage $V_{GG}$ and also supplied to the load MOS transistor $Q_2$ of the first stage of the source-follower circuit 5 as a gate voltage $V_{GG}$.

Figure 4:
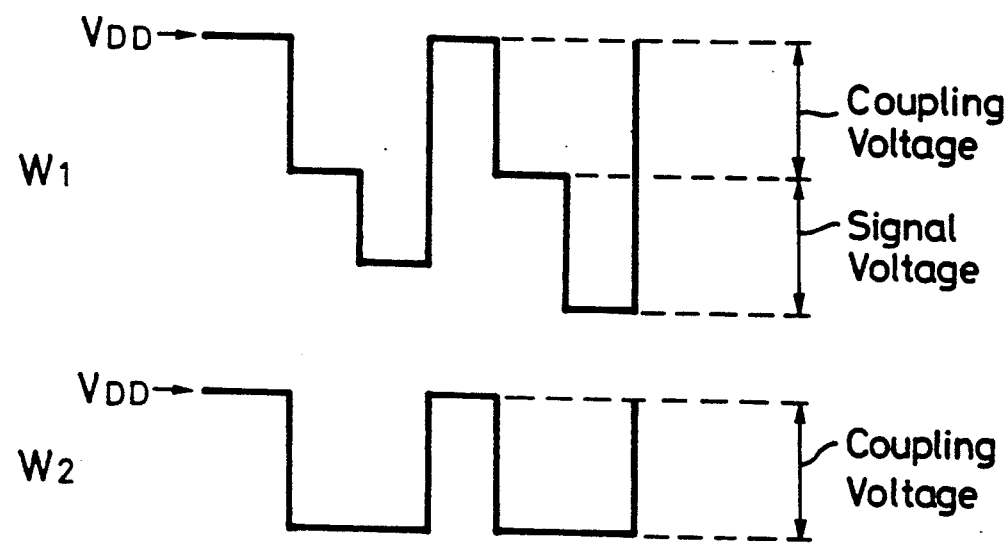
FIG. 4 is a diagram of waveforms of respective outputs W1, W2 of floating diffusion regions FD1, FD2.

Operation of the output circuit thus arranged according to the present invention will hereinafter be described with reference to a waveform diagram forming FIG. 4. In FIG. 4 of the accompanying drawings, W1 depicts a waveform of an output from the signal detection floating diffusion section FD1 and W2 depicts a waveform of an output from the dummy floating diffusion region FD2, respectively. Reset levels of the waveforms W1, W2 are both equal to potentials $V_{RD}$ of the reset drains RD1, RD2.

When a bias voltage of the potential $V_{RD}$ corresponding to the reset drain RD2 is output from the bias generator circuit 7, the gate voltage $V_{GG}$ of the load MOS transistors $Q_2$, $Q_6$ of the first stage in the source-follower circuit 5 and the bias voltage generator circuit 7 are increased so that a current of large amount is flowed to the source-follower circuits of the first stage of the source-follower circuit 5 and the bias generator circuit 7. Therefore, a current which is flowed to the drive MOS transistors $Q_1$, $Q_5$ thereof must be increased, which as a result loweres DC bias voltages X1, X2 of the source-follower circuit of the first stages thereof.

Then, when a voltage corresponding to the black level is output from the bias generator circuit 7, the gate voltages $V_{GG}$ of the load MOS transistors $Q_2$, $Q_6$ of the first stage of both circuits 5, 7 are lowered with the result that a current flowed to the source-follower circuits of the first stage of both circuit 5, 7 is decreased. Consequently, a current which is flowed to the drive MOS transistors $Q_1$, $Q_5$ also is decreased and hence the DC bias voltages X1, X2 of the source-follower circuits of the first stage thereof are increased.

More specifically, if the output of positive phase from the dummy floating diffusion region FD2 is supplied to the load MOS transistor $Q_2$ at the first stage of the source-follower circuit 5 as the bias voltage $V_{GG}$ and also fed back to the load MOS transistor $Q_6$ of the first stage of the bias generator circuit 7 as the gate voltage $V_{GG}$, then different currents are flowed to the source-follower circuit of the first stage when the reset drain level $V_{RD}$ and the black level are output respectively, thereby decreasing the coupling voltage.

Further, in the source-follower circuit 5, to reduce the area of the gate of the drive MOS transistor $Q_1$ of the first stage is a relatively effective means for increasing the conversion efficiency thereof. In the manufacturing process, the DC bias voltage at the output from the source-follower circuit at the first stage is most influenced by the fluctuation of the threshold voltage $V_{TH}$ of the MOS transistor and the channel width W thereof.

According to the above-mentioned circuit configuration, since the DC bias voltage is suppressed from being fluctuated by the output from the dummy floating diffusion region FD2, it is possible to obtain the output circuit which is strong against the fluctuations of the threshold voltage $V_{TH}$ of the MOS transistor, the channel width W thereof, the channel length L thereof or the like.

While the source-follower circuit of the present invention is applied to the CCD solid stage image sensing device as described above, of course, the present invention is not limited thereto and may be applied to a CCD line (linear) sensor, a CCD delay element or the like.

As described above, according to the present invention, since the positive phase output from the dummy floating diffusion region is supplied to the load MOS transistor of the source-follower circuit as the bias voltage and also fed back thereto as the gate voltage of the load MOS transistor of the bias generator circuit as the gate voltage, the coupling voltage can be decreased. There is then the effect such that the signal processing in the outside can be effected by a circuit such as an inexpensive buffer circuit whose dynamic range is small.

Furthermore, the DC bias voltage is suppressed from being fluctuated by the output from the dummy floating diffusion region. Also, the output circuit of the present invention becomes strong against the fluctuation of the threshold voltage $V_{TH}$ of the MOS transistor, the channel width W thereof, the channel length L thereof or the like in the manufacturing process. Consequently, a fraction defective can be reduced and the conversion efficiency can be considerably improved in accordance with the reduction of the scale of the drive MOS transistor.

Having described a preferred embodiment of the invention with reference to the accompanying drawings, it is to be understood that the present invention is not limited to that precise embodiment and that various changes and modifications thereof could be effected by one skilled in the art without departing from the spirit or scope of the invention as defined in the appended claims.

What is claimed is:

1. A source-follower circuit for a charge transfer device comprising:
   (a) a charge transfer section for transferring a signal charge;
   (b) a floating diffusion region provided at an output end of said charge transfer section and to which the signal charge from said charge transfer section is supplied;
   (c) a source-follower stage connected to said floating diffusion region to convert said signal charge into a signal voltage and including a first load transistor and a first drive transistor;
   (d) a dummy floating diffusion region to which no signal charge is supplied; and
   (e) a bias generator circuit including a second drive transistor and a second load transistor, wherein an output of said dummy floating diffusion region is supplied to said second drive transistor of said bias generator circuit and a voltage developed at a junction between said second drive transistor and said second load transistor is supplied to an input of said first load transistor as a bias voltage.

2. The circuit according to claim 1, wherein said first and second drive transistors and said first and second load transistors are each formed of a MOS (metal oxide semiconductor) type FET (field effect transistor).

3. The circuit according to claim 1, wherein said bias generator circuit is controlled such that, when a potential of said floating diffusion region is raised, a potential at said dummy floating diffusion region is raised and the bias voltage supplied to the input of said first load transistor is raised.

4. The circuit according to claim 1, wherein said source-follower stage is formed of cascaded source-follower stages of two stages.

5. The circuit according to claim 1, wherein said bias generator circuit is formed of cascaded source-follower stages of two stages.

* * * * *